US005651622A

United States Patent [19]

Kim

[11] Patent Number: 5,651,622
[45] Date of Patent: Jul. 29, 1997

[54] KEYBOARD SEPARABLE INTO TWO PARTS IN WHICH AN ANGLE BETWEEN ITS TWO PARTS CAN BE CHANGED

[75] Inventor: Tae-Yong Kim, Seoul, Rep. of Korea

[73] Assignee: SamSung Electronics Co., Ltd., Suwon, Rep. of Korea

[21] Appl. No.: 662,324

[22] Filed: Jun. 12, 1996

[30] Foreign Application Priority Data

Jun. 15, 1995 [KR] Rep. of Korea ............ 15887/1995

[51] Int. Cl.⁶ ........................................... B41J 5/10
[52] U.S. Cl. ................. 400/489; 235/145 R; 400/682
[58] Field of Search ........................... 400/489, 472, 400/682, 82; 345/168; 361/680; 235/145 R

[56] References Cited

U.S. PATENT DOCUMENTS

| 5,198,991 | 3/1993 | Pollitt | 364/708 |
| 5,228,791 | 7/1993 | Fort | 400/489 |
| 5,267,127 | 11/1993 | Pollitt | 361/680 |
| 5,318,367 | 6/1994 | Braun et al. | 400/82 |
| 5,342,005 | 8/1994 | Szmanda et al. | 248/118 |
| 5,361,082 | 11/1994 | Chung | 345/168 |
| 5,388,921 | 2/1995 | Chung | 400/472 |
| 5,454,652 | 10/1995 | Huellemeier et al. | 400/489 |
| 5,519,570 | 5/1996 | Chung | 361/680 |

Primary Examiner—John S. Hilten
Assistant Examiner—Leslie Grohusky
Attorney, Agent, or Firm—Robert E. Bushnell, Esq.

[57] ABSTRACT

A keyboard separable into two parts in which an angle between its two parts can be changed includes: a left keyboard having a first connection ring attached thereto, the left keyboard being separable to the left side from a center position through a rotative motion of the first connection ring; a right keyboard having a second connection ring attached thereto, the right keyboard being separable to the right side from a center position through a rotative motion of the second connection ring; a hinge ring disposed between the first connection ring of the left keyboard and the second connection ring of the right keyboard for causing the right and left keyboards to rotate in constant angular increments; and a main plate having the connection rings of the right and left keyboards attached thereto, the main plate supporting the right and left keyboards. The separation of the right and left keyboards can reduce fatigue of the wrists or shoulders when utilizing the keyboard for long periods and, as a result, work productivity is increased.

9 Claims, 4 Drawing Sheets

KEYBOARD SEPARABLE INTO TWO PARTS IN WHICH AN ANGLE BETWEEN ITS TWO PARTS CAN BE CHANGED

CROSS REFERENCE TO RELATED APPLICATION

This application makes reference to, incorporates the same herein, and claims all benefits accruing under 35 U.S.C. §119 from an application for *A Keyboard Separable Into Two Parts In Which An Angle Between Its Two Parts Can Be Changed* earlier filed in the Korean Industrial Property Office on 15 Jun. 1995 and there duly assigned Ser. No. 15887/1995.

BACKGROUND OF THE INVENTION

1. Field of the Invention

The present invention relates to a keyboard separable into two parts in which an angle between its two parts can be changed. More particularly, the present invention relates to a separable keyboard in which an angle between its two parts can be changed, and in which the angle can be varied in discrete multiple steps according to the users' physical need.

2. Description of the Prior Art

Portable instruments which are generally used are compact in size in order to input or output information in any place and at any time for fast information processing and information communication, and there is a trend toward increasing demand for these portable instruments. In an effort to provide for compact size and light weight of the instrument, a keyboard of a portable computer such as a notebook PC which emphasizes light weight and compactness, is fixed.

Earlier efforts such as represented by the Pollitt references, U.S. Pat. Nos. 5,198,991 and 5,267,127, have a personal computer having a keyboard which is separable into two parts. I have noted that the two parts of the keyboard are permanently attached together and are not separable from the remainder of the computer. In addition, the angle between the two parts of the keyboard is continuously adjustable rather than being discretely adjustable in incremental steps.

More recent efforts such as found in the three Chung references, U.S. Pat. Nos. 5,361,082, 5,388,921, and 5,519,570, all disclose similar structures of computer keyboards in which the keyboards are divided into two or more portions which may be rotatable and removable. I have observed that none of the Chung references teaches or suggests keyboards which are movable in discrete increments nor do they have slots for containing pins attached to the keyboard portions causing the pins to move linearly.

SUMMARY OF THE INVENTION

An object of the present invention is to provide an improved keyboard.

It is another object to provide a keyboard separable into two parts such that an angle between its two parts can be controlled; the angle of the keyboard is discretely variable, corresponding to a users' physical needs.

It is yet another object to provide a keyboard that can also be used while being separated from a body of a system.

The above mentioned object can be effected with a keyboard separable into two parts, having an angle between its two parts capable of being changed.

The keyboard can be constructed with a left keyboard having a first connection ring attached thereto, the left keyboard being separable to the left side from a center position through a rotative motion of said first connection ring; and a right keyboard having a second connection ring attached thereto, the right keyboard being separable to the right side from a center position through a rotative motion of said second connection ring. A hinge ring disposed between said first connection ring of said left keyboard and said second connection ring of the right keyboard for causing the right and left keyboards to rotate in discrete angular increment, and a main plate having the first and second connection rings attached thereto, with the main plate supporting the right and left keyboards.

DETAILED DESCRIPTION OF THE PREFERRED EMBODIMENTS

A preferred embodiment of the present invention will become apparent from a study of the following detailed description, when viewed in light of the accompanying drawings.

Figure 1:
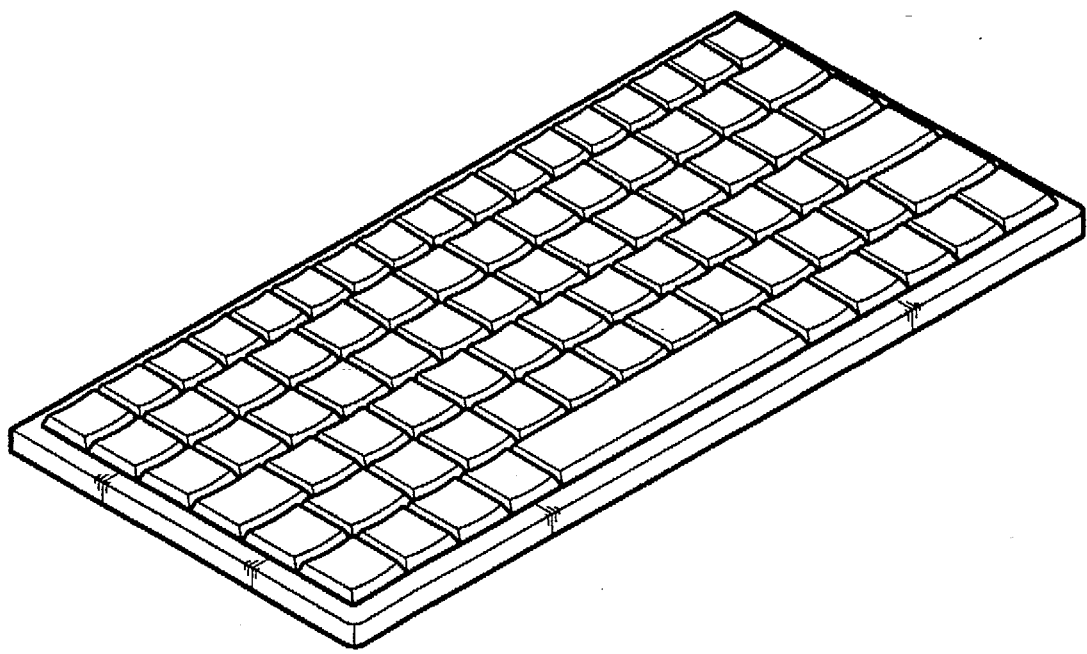
FIG. 1 is a perspective view of a hypothetical representation of a conventional keyboard.

FIG. 1 is a perspective view of a conventional fixed keyboard.

However, this type of fixed keyboard cannot correspond to the users' physical needs. Accordingly, the keyboard overstrains the users' wrists or shoulders when used for a long time so that it is uncomfortable to use the fixed keyboard.

One way to solve the above mentioned problem, an angle of a system itself may be made variable using peripheral supporting instruments in order to control the conditions corresponding to the users' physical conditions.

However, the above mentioned method is not very effective.

Figure 2:
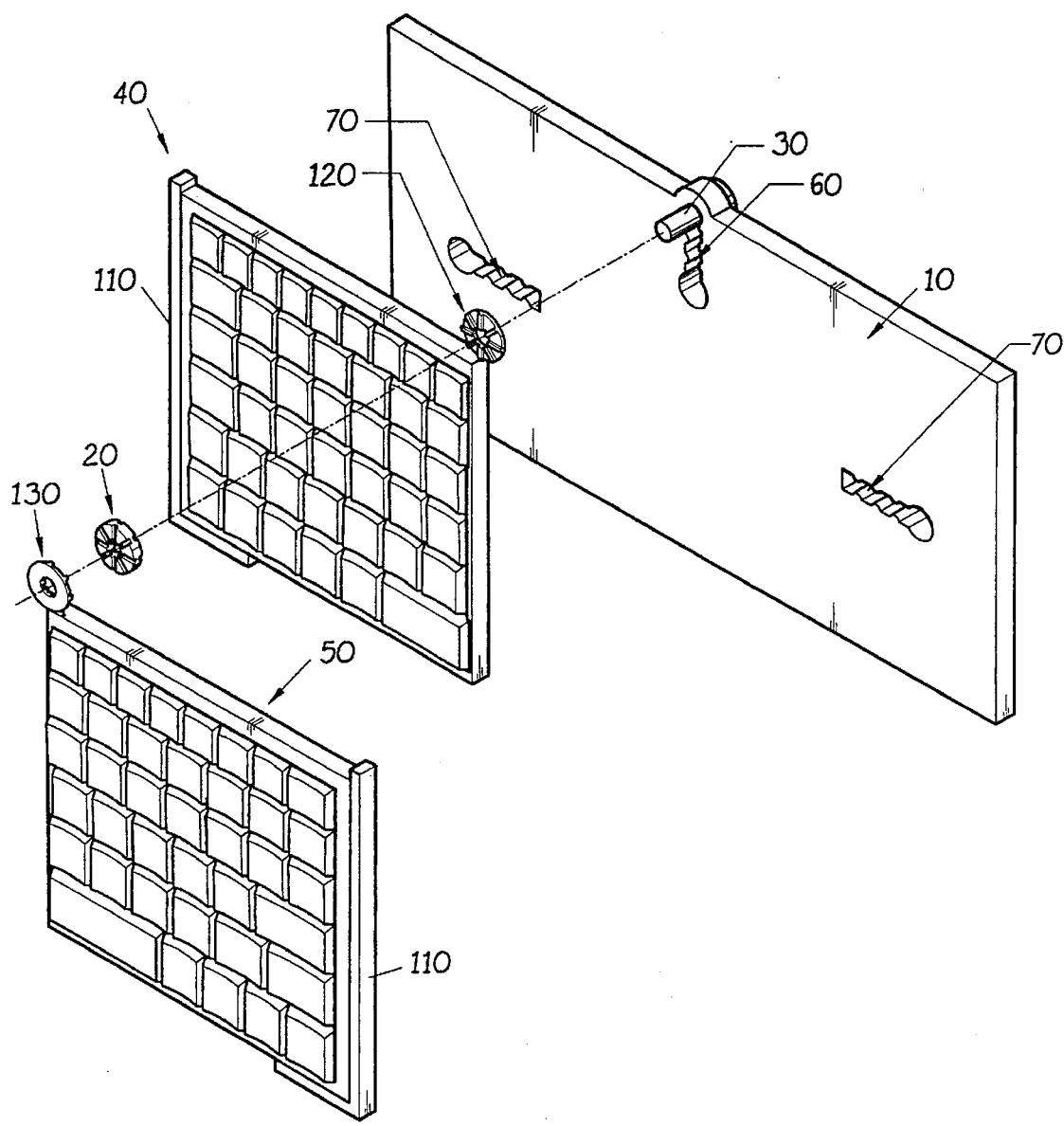
FIG. 2 is a view of the separable keyboard in accordance with a preferred embodiment of the present invention.

As shown in FIG. 2, a separable keyboard in accordance with a preferred embodiment of the present invention uses a left keyboard 40 having a first connection ring 120 attached thereto, which is separable to the left side from a center position at the "G" key as a criterion range of a left hand in a typing textbook. A right keyboard 50 having a second connection ring 130 attached thereto, is separable to the right side from a center position at the "H" key as a criterion range of a right hand in a typing textbook. A hinge ring 20 disposed between the first connection ring 120 of the left keyboard 40 and the second connection ring 130 of the right keyboard 50, forces the right and left keyboards 40 and 50 to rotate therebetween at discrete angular increments. A main plate 10, to which the connection rings 120 and 130 of the right and left keyboards are attached, supports the right and left keyboards for the rotative motion and controls the separation angle between the right and left keyboards.

Figure 3:
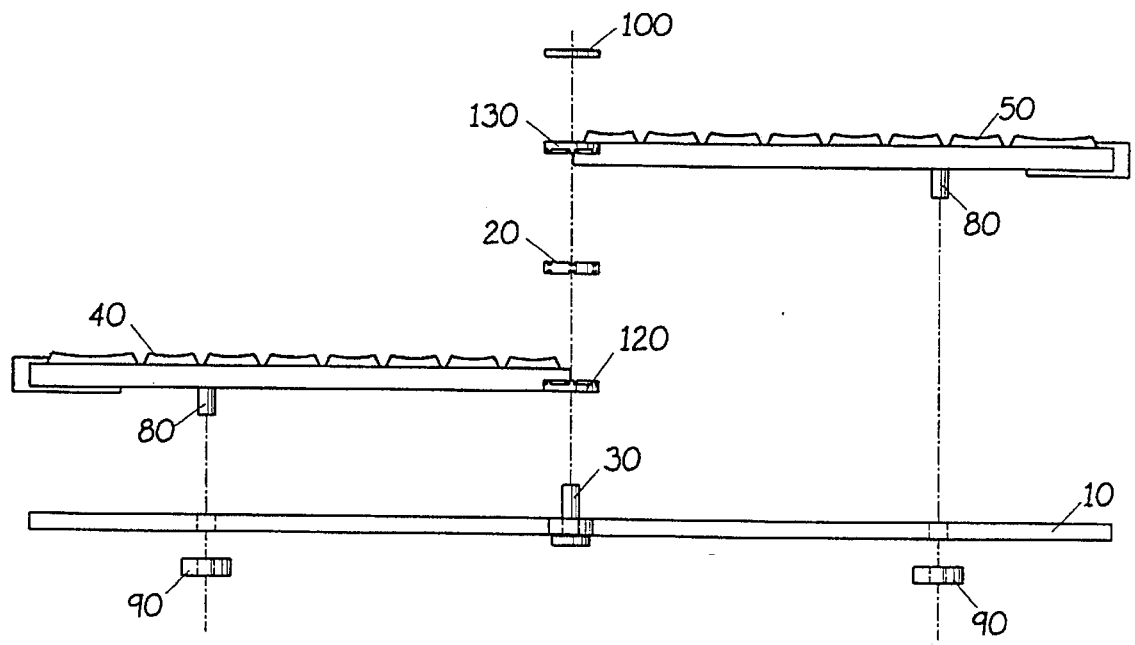
FIG. 3 is another view of the separable keyboard in accordance with a preferred embodiment of the present invention.
Figure 4:
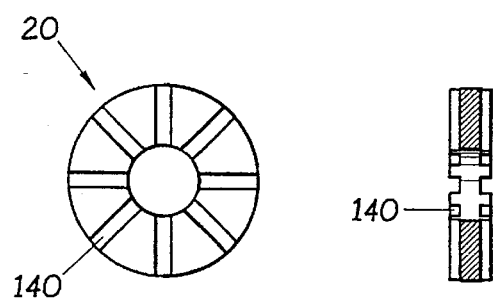
FIG. 4 is an enlarged view of a hinge ring in accordance with a preferred embodiment of the present invention.
Figure 5:
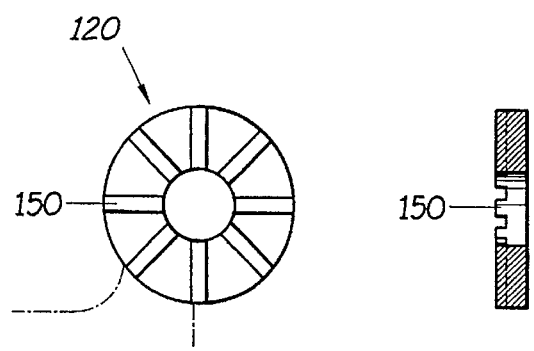
FIG. 5 is an enlarged view of a first connection ring in accordance with a preferred embodiment of the present invention.
Figure 6:
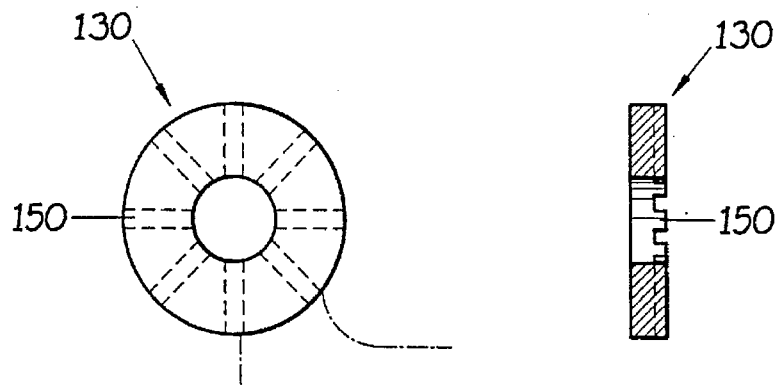
FIG. 6 is an enlarged view of a second connection ring in accordance with a preferred embodiment of the present invention.

As shown in FIG. 2 and FIG. 3, the right and left keyboards 40 and 50 each have: a keyboard axis pin 80 inserted in the main plate 10 which forces the right and left keyboards to move linearly; a fastener 90 for keeping the keyboard axis pin 80 inserted in the main plate 10 and a guide plate 110 for reinforcing the part of the keyboard deviating from the main plate 10 due to a rotative motion of the two keyboards around the first connection ring 120 and the second connection ring 130.

The hinge ring 20 includes grooves 140 disposed at constant angular intervals on both sides of the hinge ring 20.

The main plate 10 has a main axis pin 30 where the first connection ring 120 and the second connection ring 130 are attached and rotate, a connection ring fastener 100 for keeping the first connection ring 120 and the second connection ring 130 attached to the main axis pin 30, a main guide slot 60 which is a path allowing up-and-down movement of the main axis pin 30 and two side guide slots 70 which are paths for right-and-left movement of the right and left keyboards 40 and 50.

The first and second connection rings 120 and 130 includes teeth 150 disposed at constant angular intervals corresponding to the grooves 140 of the hinge ring 20 for controlling the rotational angle of the right and left keyboards 40 and 50.

The operation of the separable keyboard in accordance with the preferred embodiment of the present invention and having the above mentioned construction, is described as follows.

The first connection ring 120 of the left keyboard 40 is disposed around the main axis pin 30 and the hinge ring 20 is also disposed around the main axis pin 30 resulting in the hinge ring being placed on top of the first connection ring 120 of the left keyboard 40.

The second connection ring 130 of the right keyboard 50 is also disposed around the main axis pin 30 resulting in the second connection ring 130 of the right keyboard 50 being placed on top of the hinge ring 20. Then, the first connection ring 120 and the second connection ring 130 are kept on the main axis pin 30 by the connection ring fastener 100.

The keyboard axis pin 80 of each keyboard, which is inserted into the side guide slot 70 of the main plate 10, can move linearly.

The lower grooves of the hinge ring grooves 140 of the hinge ring 20 cooperate with the teeth 150 of the first connection ring 120 of the left keyboard 40, and the upper grooves of the hinge ring grooves 140 of the hinge ring 20 cooperate with the teeth 150 of the second connection ring 130 of the right keyboard 50, so that it is possible to change the angle for separating the right and left keyboards in discrete angular increments.

Figure 7:
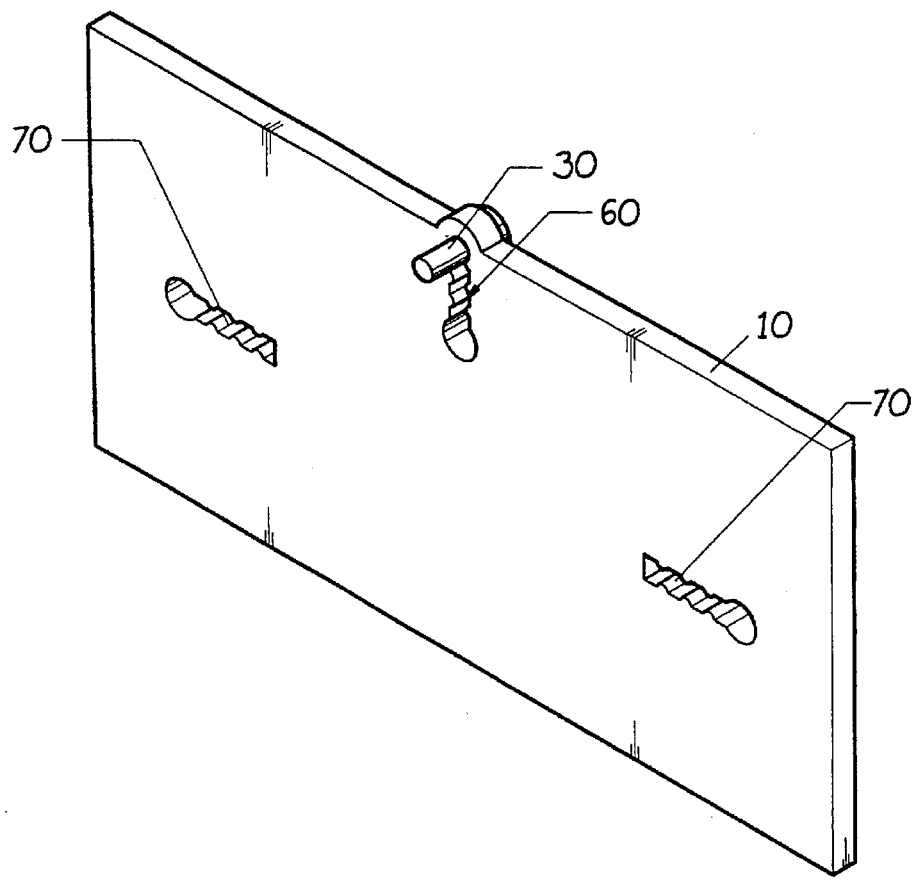
FIG. 7 is an enlarged view of a guide slot in accordance with a preferred embodiment of the present invention.

Also, as shown in FIG. 7, the main axis pin 30 and the axis of motion of the keyboard can move incrementally in discrete multiple steps because the main guide slot 60 and the side guide slots 70 have protrusions disposed at intervals.

The main plate 10 and the right and left keyboards 40 and 50 can also be separated through the circular end portions of the main guide slot 60 and the side guide slots 70.

In using the right and left keyboards 40 and 50 at a desired angle, the main axis pin 30 which is connected to the first and the second connection rings 120 and 130 of the right and left keyboards moves downward through the main guide slot 60; the keyboard axis pins 80 of the two keyboards must move linearly outwards from a center of the main plate 10 along the side guide slots 70.

The first and second connection rings 120 and 130 rotate at discrete angular increments due to a linear motion of the keyboard axis pins 80 of the right and left keyboards 40 and 50, so that the right and left keyboards 40 and 50 can be spread into a fan shape.

When the right and left keyboards 40 and 50 are separated due to the downward motion of the main axis pin 30, if the main axis pin 30 moves upwards through the main guide slot 60, the keyboard axis pins 80 of the two keyboards move linearly to the center of the main plate 10 through the side guide slots 70.

If the keyboard axis pins 80 of the two keyboards move linearly to the center of the main plate 10 through the side guide slots 70, the first and the second connection rings 120 and 130 rotate in the direction of reducing the separation angle of the right and left keyboards 40 and 50.

Accordingly, the keyboard is appropriate for the users' physical needs and desires through the up-and-down movement of the main axis pin 30.

Also, if the keyboard axis pins 80 of the two keyboards are fixed at the main plate 10 by using the keyboard fasteners 90, the keyboards maintain whatever angle the user prefers.

Also, to use the keyboard like a conventional keyboard, a force must be applied to the guide plates 110 so that the keyboard axis pins 80 of the two keyboards move toward the center of the main plate 10 linearly through the side guide slots 70 and the main axis pin 30 moves upward through the main guide slot 60.

Consequently, fatigue of the wrists or other parts of the body can be reduced and work productivity can be improved when using the computer for a long time because the separation angle of the two keyboard parts forming an input unit of a portable computer can be variable according to the users' physical needs and desires.

Also, a portable instrument related to the present invention is not restricted to only portable computers, but can be applied to a word processor and a portable data input unit, etc.

What is claimed is:

1. A keyboard separable into two parts, an angle between its two parts capable of being changed, said keyboard comprising:

a left keyboard having a first connection ring attached thereto, said left keyboard being separable to the left side from a center position through a rotative motion of said first connection ring;

a right keyboard having a second connection ring attached thereto, said right keyboard being separable to the right side from a center position through a rotative motion of said second connection ring;

a hinge ring disposed between said first connection ring of said left keyboard and said second connection ring of said right key board for causing said right and left keyboards to rotate in discrete angular increments; and a main plate having said first and second connection rings attached thereto, said main plate supporting said right and left keyboards.

2. A separable keyboard as defined in claim 1, said main plate having an aperture and said left keyboard comprising:

a keyboard axis pin inserted into said aperture in said main plate, said aperture causing said pin to move linearly;

a fastener for keeping said keyboard axis pin inserted into said main plate; and a guide plate for reinforcing that portion of said keyboard deviating from said main plate due to a rotative motion of said first connection ring.

3. A separable keyboard as defined in claim 1, said main pate having an aperture and said right keyboard comprising:

a keyboard axis pin inserted into said aperture in said main plate, said aperture causing said pin to move linearly;

a fastener for keeping said keyboard axis pin inserted into said main plate; and a guide plate for reinforcing that portion of said keyboard deviating from said main plate due to a rotative motion of said second connection ring.

4. A separable keyboard as defined in claim 1, said hinge ring having two faces each comprising radial grooves, said grooves being disposed at discrete angular intervals on both faces thereof.

5. A separable keyboard as defined in claim 4, said first connection ring having a face comprising teeth disposed at radially discrete angular intervals corresponding to said grooves on one face of said hinge ring for controlling the rotational angle of said left keyboard.

6. A separable keyboard as defined in claim 4, said second connection ring having a face comprising teeth disposed at radially discrete angular intervals corresponding to said grooves on one face of said hinge ring for controlling the rotational angle of said right keyboard.

7. A separable keyboard as defined in claim 1, said main plate comprising:

a main axis pin disposed such that said first connection ring and second connection ring are attached thereto and rotate;

a connection ring fastener for keeping said first connection ring and second connection ring attached to said main axis pin and to prevent movement of said two parts of said keyboard;

a main guide slot having said main axis pin passing therethrough, said main guide slot allowing up-and-down movement of said main axis pin; and a pair of side guide slots respectively having keyboard axis pins of said left and right keyboards passing therethrough, said pair of slots allowing right-and-left movement of said right and left keyboards.

8. A separable keyboard as defined in claim 7, said main guide slot having protrusions disposed at discrete intervals therein, said protrusions allowing said main axis pin to move incrementally in discrete steps and said main guide slot further having a circular end portion, said circular end portion allowing the easy detachability of said main axis pin from said main plate.

9. A separable keyboard as defined in claim 7, each of said side guide slots having protrusions disposed at discrete intervals therein, said protrusions allowing its respective keyboard axis pin to move incrementally in discrete multiple steps and said guide slot further having a circular end portion, said circular end portion allowing easy detachability of its respective keyboard axis pin from said main plate.

* * * * *